United States Patent [19]

Modes

[11] 3,955,595
[45] May 11, 1976

[54] AUTOMATIC FLUID FLOW REGULATOR
[75] Inventor: Edward E. Modes, Deerfield, Ill.
[73] Assignee: Powers Regulator Company, Skokie, Ill.
[22] Filed: Mar. 25, 1974
[21] Appl. No.: 454,720

Related U.S. Application Data
[63] Continuation-in-part of Ser. No. 416,202, Nov. 15, 1973, abandoned.

[52] U.S. Cl. .................... 137/517; 236/49; 251/337
[51] Int. Cl.² ............... G05D 7/00; F24F 11/04
[58] Field of Search ............. 137/517, 513.5, 503, 137/512.1; 251/337

[56] References Cited
UNITED STATES PATENTS

| | | | |
|---|---|---|---|
| 2,925,826 | 2/1960 | Streeter | 137/517 |
| 2,928,414 | 3/1960 | Streeter | 137/517 |
| 2,929,402 | 3/1960 | Streeter | 137/517 |
| 2,941,401 | 6/1960 | Streeter | 137/517 |
| 3,131,716 | 5/1964 | Griswold et al. | 137/503 |
| 3,255,963 | 6/1966 | Gorchev et al. | 236/49 X |
| 3,540,484 | 11/1970 | Brown et al. | 137/517 X |

Primary Examiner—William E. Wayner
Attorney, Agent, or Firm—Hume, Clement, Brinks, Willian, Olds & Cook, Ltd.

[57] ABSTRACT

A fluid flow regulating device for use in fluid handling systems which is capable of maintaining substantially constant flow rates over a wide range of variations in system pressure. The device includes a housing having disposed therein a conduit whose lateral wall includes one or more apertures of a predetermined configuration. A piston is disposed within the conduit and is axially displaceable, in response to pressure differentials, throughout the portion of the conduit wherein the apertures are located. A spring mechanism having a specified non-linear coefficient of stiffness is employed to yieldably resist downstream displacement of the piston. The piston and aperture together form a variable area flow passageway through which substantially all the fluid must pass. A pneumatic, thermometric mechanism may also be employed to displace the piston within the conduit in response to changes in temperature and independent of pressure variations. Finally, the device may be arranged so that its sole source of energy is derived from the air flow being regulated, thus eliminating any need for an external energy source.

3 Claims, 9 Drawing Figures

AUTOMATIC FLUID FLOW REGULATOR

This is continuation-in-part of copending application Ser. No. 416,202, filed Nov. 15, 1973, now abandoned.

BACKGROUND OF THE INVENTION

The present invention relates generally to flow control devices, and more particularly, to a self-adjusting fluid flow regulator for use in fluid handling systems which is capable of maintaining a constant flow rate over a wide range of variations in system pressures.

The invention further relates to a fluid flow regulator as mentioned above which is also temperature responsive; i.e., the regulator will adjust the fluid flow rate so as to maintain a given temperature within the environment serviced by the system.

While the principle features of the flow regulator of the present invention are not limited in application to any particular fluid or fluid handling system, its desirable features and its attendant advantages are most apparent when employed in conjunction with air distribution apparatus.

Air distribution systems for automatically controlling the environmental temperature in habitable, enclosed areas generally employ a fan pressurized air source which supplies air through ducts to the various rooms or portions of the enclosure. In each room one or more terminal ports may be found. These terminal ports typically are ceiling mounted, flat type diffusers which direct the discharged air horizontally along the ceiling, causing it to flow towards and down the walls of the enclosure. This flow pattern, in turn, causes the discharged air to mix with and become diluted by the room air. If pressure variations in the duct system cause the flow through the diffusers to become excessively high, objectionable velocity noise may result. On the other hand, if the flow becomes excessively low, the cool air does not move horizontally along the ceiling, but rather drops directly down causing what is known as "cold air dumping." This phenomena may result in objectionable, cold down drafts on the occupants of the room.

It is, therefore, desirable to provide an air distribution apparatus which maintains the air flow between some acceptable maximum and minimum values. It is also desirable that the air distribution apparatus be responsive to changes in the ambient temperature within the enclosure such that, as the temperature rises or falls, the air flow through the system and discharged from the terminal diffusers will be adjusted so as to maintain the temperature within acceptable limits.

Another problem which is encountered in air distribution systems of this type is that the air supply means may be unable to provide a constant pressure air flow to the regulator. Therefore, in order to maintain a constant volume air flow to the terminal port, the air flow regulator must be responsive to air pressure differentials.

Fluid flow regulators, capable of maintaining a constant volume flow rate, have been disclosed in the prior art. For example, U.S. Pat. Nos. 3,037,528 and 3,540,484 disclose constant volume flow regulators as employed in air distribution systems, and U.S. Pat. No. 3,131,716 is directed to a constant flow rate regulator utilized in liquid systems. However, the flow regulators of these prior art patents have disadvantages which are overcome by the present invention. For example, the prior art devices, which employ linear spring systems, are only incrementally adjustable with respect to flow rate, whereas the present invention, which utilizes a non-linear spring system, is infinitely adjustable over a given range of flow rates. Moreover, the present invention is capable of self-adjustment in response to a signal indicative of temperature, whereas the prior art devices make no provision for such adjustment.

Therefore, according to the present invention, there is provided a fluid flow regulator device which is capable of maintaining a substantially constant flow rate to the terminal ports of a fluid distribution system. This device is responsive not only to pressure variations in the distribution system but also to changes in the temperature of the environment which is serviced by the system. Moreover, the present invention contemplates an open loop flow regulation system such that no flow metering element is required downstream from the regulator. Thus, the device is simplified structurally, and the pressure drop which is associated with such metering elements is eliminated. Finally, the flow regulator of the present invention may be utilized within an air distribution system in conjunction with a pneumatic thermostat both of which function with no external energy input other than that derived from the air flow being controlled.

SUMMARY OF THE INVENTION

Generally, the present invention is directed toward a fluid flow regulating device for use in fluid handling systems which is capable of maintaining a substantially constant flow rate. It has been discovered that where a specifice relationship is maintained between various components of the device, the accurate maintenance of constant flow rates over a wide range of variations in system pressures is possible. Specifically, it has been determined that the axial displacement of the flow restricting mechanism employed within the device should be inversely proportional to the logarithm of the resulting flow passageway area. A flow regulator designed to provide this relationship will not only maintain constant flow rate over wide variations in pressure differential, but also is capable of infinite adjustment over a given range of fluid flow rates.

One embodiment of the present invention comprises a housing, a conduit or duct disposed at least partially within said housing, a flow restricting means and a spring means. The conduit includes a lateral wall with at least one aperture therein; the flow restricting means is mounted adjacent to the aperture and is axially displaceable in response to pressure differentials between the portions of the fluid flow upstream and downstream from the regulating device; and the spring means is adapted to yieldably resist the downstream displacement of the flow restricting means. The aperture in the conduit wall and the flow restricting means together form a variable area fluid flow passageway through which substantially all the fluid must flow in passing through the regulating device. According to the present invention, the aperture must have a predetermined configuration of a specific size and shape and the spring means must have a predetermined coefficient of stiffness of a specific non-linear value such that the displacement of the flow restricting means is inversely proportional to the logarithm of the area of the fluid flow passageway.

The fluid flow regulating device of the present invention may be used in conjunction with a temperature sensitive instrument within fluid handling or distribution systems where it is desired to control both the flow rate of the fluid and the temperature of the environment into which the fluid flows. Thus, the flow regulator of the present invention may be advantageously employed in air conditioning and/or heating systems.

BRIEF DESCRIPTION OF THE DRAWINGS

The invention will be better understood by reference to the accompanying drawings.

DETAILED DESCRIPTION OF THE INVENTION

Figure 1:
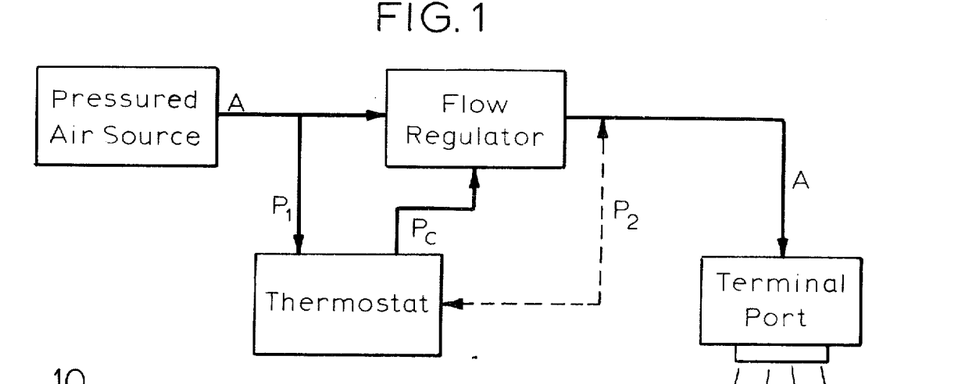
FIG. 1 is a schematic representation illustrating the use of the automatic fluid flow regulator of the present invention within the environment of an air distribution system.

The fluid flow regulating device of the present invention may be used in conjunction with an air distribution system, as is illustrated in FIG. 1. A pressurized air source supplies an air flow A which is conveyed via a duct network to various terminal ports. The flow regulator is positioned within the duct network so as to control the flow rate to the terminal ports. Typically, each regulator is provided with a temperature sensing device, for example a pneumatic thermostat, which generates a signal $P_c$ indicative of the ambient temperature within the area serviced by the system. The signal $P_c$ is transmitted via a conduit to the regulator which adjusts the air flow so as to maintain the ambient temperature within acceptable limits.

It is also preferable that the regulator of the present invention together with its activating thermostat be independent of external energy sources. Accordingly, the air supply, at a pressure $P_1$, utilized by the pneumatic thermostat to generate the temperature indicative pressure signal is drawn from the duct network of the air distribution system itself.

Figure 2:
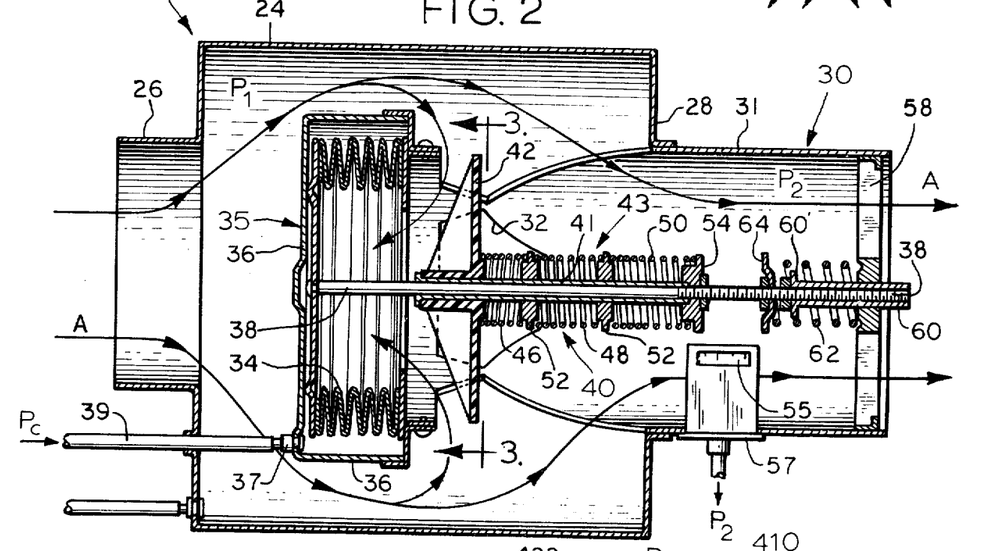
FIG. 2 is a cross-sectional view of one embodiment of the fluid flow regulator contemplated by the present invention.

FIG. 2 shows in detail one embodiment of the fluid flow regulator of the present invention which may be employed in the air distribution system illustrated by FIG. 1. The regulator, designated generally as 10, includes a housing 24 having an inlet end 26 and an outlet end 28 which is sealably engaged with a conduit or discharge duct 30. The discharge duct is disposed at least partially within housing 24 and includes a lateral wall 31 having at least one aperture 32 which defines an air flow passageway through which substantially all the air must flow in passing through the regulator.

Mounted within discharge duct 30 is an axially extending shaft 38, which shaft is capable of axial displacement. Means 35 for axially displacing shaft 38 in response to an air pressure signal is disposed within the housing 24 and fixably secured in axial alignment with discharge duct 30. Displacement means 35 includes a bellows enclosure 36 which has a means 37 for receiving a pressure signal $P_c$, and a bellows 34 disposed within bellows enclosure 36 and forming a sealed upstream end section of the discharge duct 30. The shaft 38 has its upstream end secured to the bellows 34 which is responsive to an air pressure signal $P_c$. This pressure signal is transmitted to the bellows enclosure 36 via conduit 39 and signal receiving means 37. A rise or fall in the pressure signal received in the bellows enclosure 36 results in an axial expansion or compression of the bellows 34 which, in turn, results in axial displacement of shaft 38.

An air flow restriction means 40 is mounted on shaft 38 within discharge duct 30. Restriction means 40 is sensitive to changes in the pressure differential between the upstream and downstream air flows, and includes a mounting tube 41, a piston 42, and a spring means 43 for yieldably resisting downstream displacement of piston 42. Mounting tube 41 is slidably engaged on shaft 38, and piston 42 is slidably engaged on mounting tube 41. The means 43 for yieldably resisting downstream displacement of piston 42 includes compression springs 46, 48, and 50, spring guides 52. An adjusting means 54 is also provided.

In order to provide the air flow regulating means 10 with an aperture 32 of the appropriate configuration and a spring mechanism 43 of the appropriate spring coefficient, it is necessary to consider the basic equation which represents the fluid system involved:

$$Q = C_D AV = (C_D A)(\sqrt{2gh}) \text{ or } A = K\ ^Q/\sqrt{h}$$

where:
Q = Volume flow rate
$C_D$ = Coefficient of discharge
A = Area of flow passageway
V = Velocity of fluid through the passageway
g = Acceleration due to gravity
h = Pressure differential across the passageway
K = Numerical constant Accordingly, it is an object of the present invention to provide a device which will automatically adjust A to the value, $K\ ^Q/\sqrt{h}$, for a desired Q and within a given range of maximum to minimum h. This, of course, is accomplished by displacement of piston 42 over that portion of duct 30 wherein aperture 32 is located. An increase in the pressure differential across the restriction means 40 will result in downstream displacement of piston 42. Likewise, a decrease in the pressure differential will result in upstream displacement of piston 42. Thus, in response to pressure differential ($h = P_1-P_2$), the area of the air flow passageway (area A) formed by the aperture 32 and piston 42 is automatically adjusted.

In accordance with the present invention, it has been found that where the displacement of the piston 42 is inversely proportional to the logarithm of the area A, a fluid flow regulator is obtained which is capable of maintaining a constant flow rate for a wide range of variations in system pressure.

Figure 5:
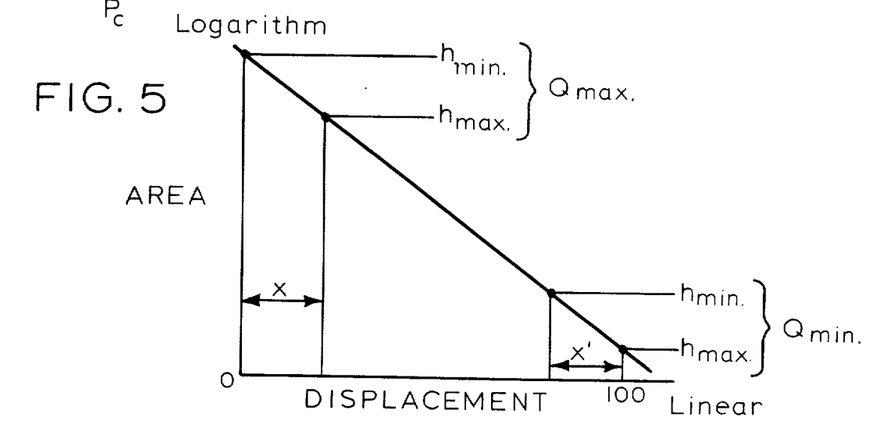
FIGS. 5 & 6 are graphical representations of the relationships between various structural features of the fluid flow regulator of the present invention, which relationships are important to the proper operation of the invention.

Therefore, by plotting the logarithm of the area A versus the displacement of the piston 42, as is shown in FIG. 5, for maximum and minimum values of Q, it is possible to determine the dimensions and thus the appropriate configuration of aperture 32. Significantly, the arrows x and x' in FIG. 5 are of equal length. This demonstrates that for any flow rate Q, within the desired range, the change in displacement of piston 42 remains the same for a given range of pressure differentials. Therefore, knowing generally the range of pressure differentials to be experienced within the flow regulator, a single spring means with a predetermined non-linear coefficient of stiffness may be employed for any flowrate from maximum to minimum Q.

Figure 6:
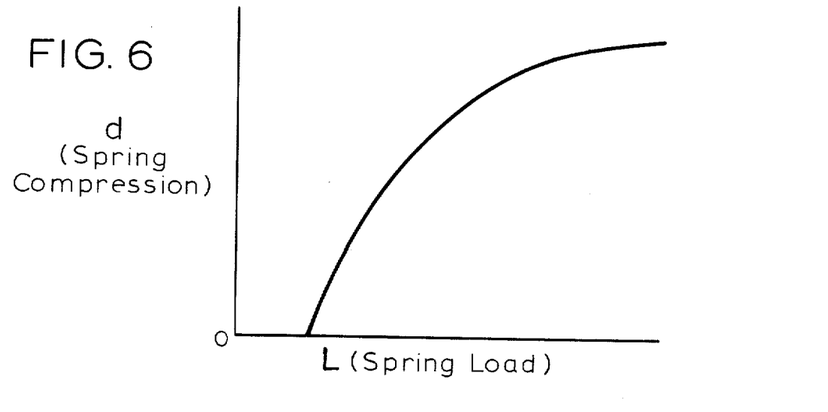

Thus, as is shown in FIG. 6, for a given deflection of piston 42 at a given pressure differential, and given the surface area of piston 42, the appropriate non-linear spring coefficient may be determined by plotting spring compression (equal to piston displacement) versus spring load. In order to approximate this non-linear spring coefficient it has been found desirable to use a plurality of springs each with a different coefficient of stiffness. Thus, in the preferred embodiment of the present invention, three compression springs 46, 48, and 50 are employed such that, as piston 42 is displaced in a downstream direction, the springs 46, 48 compress to solid height in sequence so as to provide the desired non-linear spring mechanism.

In the practice of the theoretical principles outlined above, it has also been found that a uniform pressure differential is not obtained across the entire area of the piston faces. It is believed that this is caused by the fluid flow pattern in the peripheral regions of the piston. Therefore, in order to accommodate these peripheral flow pattern effects, it has been found necessary to enlarge slightly the dimensions of aperture 32 so as to maintain the desired relationship between piston displacement and flow passageway area as illustrated in FIG. 5.

Of course, more than one aperture may be employed so as to provide the appropriate area A. For example, duct 30 may include two, three, four, or more apertures evenly spaced about its lateral wall 31. It is preferred, however, that the group of apertures have a common axial position on duct 30 so as to provide uniform interaction with displaceable piston 42.

Figure 3:
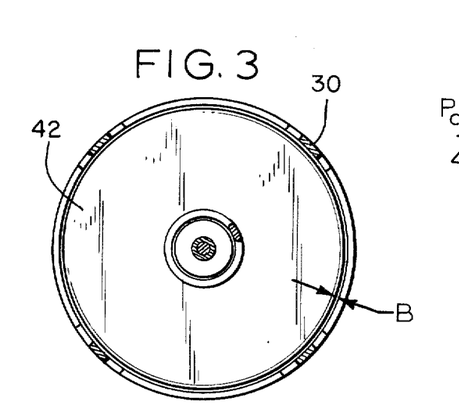
FIG. 3 is a cross-sectional view taken along line 3—3 of FIG. 2.

Another feature of the preferred embodiment of the invention can be seen in FIG. 3. Piston 42 is positioned in axial alignment within duct 30 and has a surface area which is less than the cross-sectional area of duct 30 such that the piston 42 together with duct 30 defines an annular passageway, designated as B. This annular passageway has a predetermined area such that, even when piston 42 is in its exreme downstream position and the air flow passageway is substantially closed thereby, a certain minimum air flow will be provided to diffuser 20 so as to reduce the possibility of cold air dumping.

Referring again to FIGS. 1 and 2, the adjusting means 54 comprises a threaded nut which is fixably secured to mounting tube 41 and by which the entire flow restricting means 40 may be manually positioned within discharge duct 30, thereby providing an initial setting for the air flow through regulating means 10 and into the terminal ports. The air flow regulator may also be provided with an air flow scale 55 positioned within duct 30 so as to provide a reference for the in place adjustment of flow restricting means 40 by means of adjusting nut 54. The scale 55 is observed through a port in the lateral wall 31 with plate 57 detachably secured thereto so as to provide a cover for this port when the regulating device is in service.

The downstream end of discharge duct 30 is provided with a spider support member 58 within which is slidably mounted a threaded journal 60. The shaft 38 is threaded in its downstream portion and is threadably engaged within journal 60 so as to maintain an axial alignment within duct 30 and housing 24. Also mounted on shaft 38 adjacent to spider 58 is turn down spring 62 and spring plate 64. Spring 62 bears against spider 58 and, when compressed, produces a thrust on spring plate 64. The spring plate 64 is threaded on shaft 38 so as to transmit the force produced by spring 62 to shaft 38, which force opposes the force resulting from the pressure signal $P_c$ applied to the outside of bellows 34. The linear gradient of this spring should be such that for a given pressure signal $P_c$ a predetermined axial displacement of flow restricting means 40 will result, thereby providing the appropriate thermostatic adjustment. The adjustment of spring plate 64 is desirable so as to compensate for normal variations in springs, bellows, etc.

The desired maximum air flow through the regulating device and terminal ports may be manually set by positioning adjusting nut 54 with reference to air flow rate scale 55, while bellows 34 is fully expanded as is shown in FIG. 2. This will place piston 42 in its extreme upstream position for the given setting and thus provide a maximum air flow passageway through aperture 32.

Furthermore, the capability of the thermostatic override via bellows 34 to reduce the initial air flow setting may also be limited. Journal nut 60 is provided with a shoulder 60' in its upstream end such that compression of the bellows 34 will be limited to the distance between shoulder 60' and spider 58. Thus, as is shown in FIG. 2, the journal nut 60 is in a position such that when shoulder 60' abuts spider 58, a maximum thermostatic override is obtained. Of course, this maximum value may be reduced by adjusting the nut 60 on shaft 38 to reduce thhe space between the shoulder 60' and the spider 58.

In the operation of the embodiment of the invention as shown in FIGS. 1 and 2 an air supply means provides an air flow A which flows into the housing 24 via inlet 26 and through ports (not shown) into the bellows 34. At the same time air flow A also flows through apertures 32 into discharge duct 30, through the downstream duct network and out from the terminal ports. The pressure $P_1$ in housing 24 and within bellows 34 is greater than the pressure $P_2$ found on the downstream side of piston 42 within duct 30. Thus, the pressure $P_1$ applied to the upstream face of piston 42 causes the piston to displace in the downstream direction and compress the non-linear spring system 43. This compression of spring system 43 produces a force (equal to $P_1$ x the piston area) which is transmitted through adjusting nut 54 to shaft 38. This force would, ordinarily, cause shaft 38 to displace axially in a downstream direction. However, the effective interior of bellows 34 is equal to the area on the upstream face of piston 42 such that a force is exerted on shaft 38 via bellows 34 in an upstream direction equal to that exerted via adjusting nut 54 in the downstream direction. Therefore, the forces exerted on shaft 38 from the pressure $P_1$ are balanced and there will be no deflection of the shaft 38 against spring 62. On the other hand, the pressure $P_2$ downstream of piston 42 applies a force to the downstream face of piston 42 which reduces the action of spring system 43 on the shaft and would, assuming the bellows in an intermediate position, cause deflection of shaft 38 in the upstream direction. To avoid this, the thermostatic pressure signal $P_c$, transmitted via the conduit 39 to the exterior side of the bellows 34, is referenced to pressure $P_2$. Therefore, any change in the force exerted on the downstream face of piston 42 which would tend to displace shaft 38 in either direction is balanced by an equal change in force exerted on the exterior of bellows 34 which tends to displace the shaft 38 in the opposite direction.

From the above it may be seen that the axial position of the shaft 38 is a function of the pressure signal $P_c$ only, being independent of pressure $P_1$ and $P_2$. Moreover, the axial position of the piston 42 on shaft 38 is a function only of the pressure differential ($P_1$ minus $P_2$) and the manual positioning made via adjusting nut 54, being independent of the pressure signal $P_c$.

Figure 9:
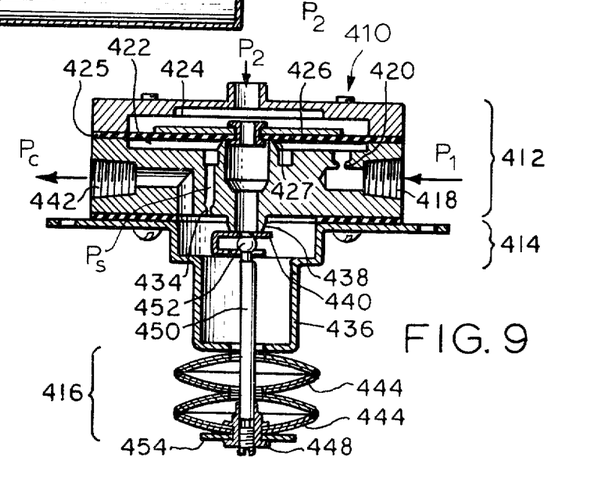
FIG. 9 is a cross-sectional view of an improved pneumatic thermostat which is to be used in conjunction with one embodiment of the fluid flow regulator.

It can be observed from the foregoing that the air flow regulating device 10 of this invention will operate to maintain a constant volume air flow through discharge duct 30 without the use of a pressure signal applied to the system via conduit 39. However, in order to provide an air flow regulating device which is responsive to the ambient temperature of the enclosed area, it is necessary to provide an air pressure signal to bellows enclosure 36 which is generated in response to changes in the ambient temperature. Typically such a pressure signal is generated by the standard pneumatic thermostats which are well-known to the art, and such a thermostat could be used in the air distribution apparatus contemplated by this invention. However, as noted above, it is most desirable that the pressure signal $P_c$ be referenced to the downstream air flow pressure $P_2$ in order to maintain the position of shaft 38 completely independent of pressures $P_1$ or $P_2$. Thus, a standard pneumatic thermostat is not ideally suited for use with the air flow regulator 10 of the present invention, since it generates a pressure signal referenced to atmospheric pressure. Accordingly, an improved pneumatic thermostat has been devised which accommodates the requirements of flow regulator 10. This improved thermostat is illustrated in FIG. 9 and is described hereinbelow.

It is also desirable, therefore, to provide a fluid flow regulator which is responsive to a pressure signal indicative of ambient temperature and which, at the same time, does not require that this pressure signal be referenced to downstream fluid pressure $P_2$. Such a regulator would then be able to function properly in conjunction with a standard pneumatic thermostat which generates a pressure signal referenced to atmospheric pressure.

Figure 4:
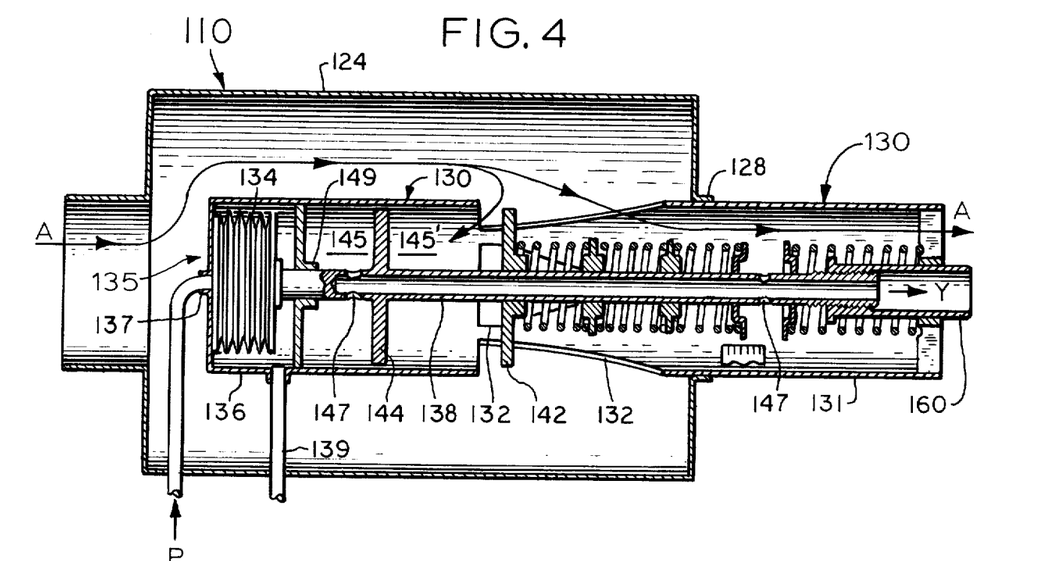
FIG. 4 is a cross-sectional view of another embodiment of the fluid flow regulator contemplated by the present invention.

The embodiment of the flow regulator of the present invention illustrated in FIG. 4 provides these desired features. This regulator, designated generally 110, includes basically the same assembly as does flow regulator 10.

In this embodiment the discharge duct 130 has a closed upstream end, a substantially open downstream end and and a lateral wall 131 which includes at least one aperture 132 having a predetermined configuration. The lateral wall 131 sealably engages the outlet end 128 of housing 124 at a point downstream from the aperture 132 thereby causing the entire air flow A to flow through aperture 132 in order to pass through the regulator 110. The means 135 for axially displacing the shaft 138 in response to an air pressure signal includes a bellows enclosure 136 disposed adjacent to the upstream end of the discharge duct 130 and a bellows 134 positioned therein with its upstream end fixedly secured to the upstream wall of the bellows enclosure. The bellows enclosure 136 includes means 137 for receiving the air pressure signal $P_c$, and the bellows 134 is adapted to axially expand or compress in response to changes in this signal. The bellows enclosure is also provided with a means 139 for venting to atmospheric pressure. This vent should be large enough to insure negligible back pressure in bellows enclosure 136 as the bellows 134 expands. The shaft 138 extends through a bearing seal 149 at the closed upstream end of duct 130 and into bellows enclosure 136 where its upstream end is secured to the free end of bellows 134. While the bellows enclosure 136 and the duct 130 are shown to be contiguous in this embodiment, such an arrangement, of course, is not essential to the invention. Thus, the bellows enclosure may be axially spaced from the upstream end of the duct 130.

Of course, it is still necessary to balance the forces exerted on shaft 138 due to pressures $P_1$ and $P_2$ so that the axial position of shaft 138 is solely a function of pressure signal $P_c$. Therefore, a balancing piston 144 is fixedly mounted on shaft 138 upstream from the throttling piston 142, and means are provided for supplying to the space upstream from the balancing piston 145 air at a pressure $P_2$. Thus, air having a pressure $P_1$ enters the space 145' in duct 130 between throttling piston 142 and the balancing piston 144 such that the forces exerted by this air on their upstream and downstream faces, respectively, is balanced. Likewise, the air supplied to the space 145 upstream of the balancing piston at pressure $P_2$ will balance the pressure exerted on the downstream face of throttling piston 142 by the downstream air flow.

It is, of course, necessary that the balancing piston 144 be positioned a sufficient distance upstream from the throttling piston 142 to insure that air having an upstream pressure $P_1$ is unable to enter the space 145 via aperture 132. Accordingly, balancing piston 144 is located on shaft 138 such that when shaft 138 is in its extreme downstream position the balancing piston 144 is still upstream from aperture 132. Likewise, duct 130 must have sufficient length such that the balancing piston 144 will not interfere with the upstream displacement of shaft 138.

Preferably, the means for supplying air to space 145 at a pressure $P_2$ comprises the shaft 138, itself which is of hollow or tubular construction and which includes radial openings 147 both upstream of the balancing piston 144 and downstream of the throttling piston 142, as is shown in FIG. 4. This arrangement is advantageous in that it requires no additional parts or materials nor does it require additional assembly steps. Of course, other means may be employed to vent the interior portion of shaft 138 with the downstream air flow. For example, no radial opening will be required downstream from the throttling piston if both the downstream extremity of shaft 138 and journal 160 are open to allow free passage of air as shown by the arrow Y in FIG. 4.

Since it is important that shaft 138 be capable of unimpeded axial displacement, it is necessary that balancing piston 144 slide freely within duct 130. Therefore, an annular space exists at the periphery of the balancing piston 144 which allows a small portion of air at a pressure $P_1$ to bleed from the space 145' to the space 145.

As was mentioned above and illustrated in FIG. 3, it is preferable that the throttling piston also have a cross-sectional area less than that of the duct, thereby forming an annular passageway which allows for a predetermined minimum flow even at complete downstream displacement of the throttling piston.

In this embodiment of the invention, in order to accommodate both the minimum flow rate and the leakage from space 145' to 145, the throttling piston 142 and balancing piston 144 are both of an equal cross-sectional area which is less than that of the duct 130. This provides two annular passageways each of which will allow for one-half of the desired minimum air flow. The annular passageway at the throttling piston will allow direct flow from upstream to downstream portions of the regulator; and the annular passageway at the balancing piston will alow an air flow from space 145' to space 145 and then through hollow shaft 138 to the downstream portions of the regulator.

It will be observed that this embodiment of the flow regulator of the present invention renders unnecessary the requirement that the bellows 134 be of any specified size, since the bellows need not compensate for any pressure forces. Moreover, since the forces exerted on shaft 138 are entirely balanced by the use of the balancing piston 144, there is also no need for pressure signal $P_c$ to be referenced to the downstream pressure $P_2$. Therefore, an ordinary pneumatic thermostat may be employed in conjunction with this flow regulator.

The operation of this embodiment is in all other respects identical to that for flow regulator 10 described hereinabove. For example, the configuration of aperture 132 is of such a size and shape and the coefficient of stiffness of the spring system 143 is of such a non-linear value that the displacement of throttling piston 142 will be inversely proportional to the logarithm of the area of the air flow passageway formed by the throttling piston and the aperture. Moreover, the manual set point and turndown adjustments are made in the same manner as disclosed above for flow regulator 10.

Figure 7:
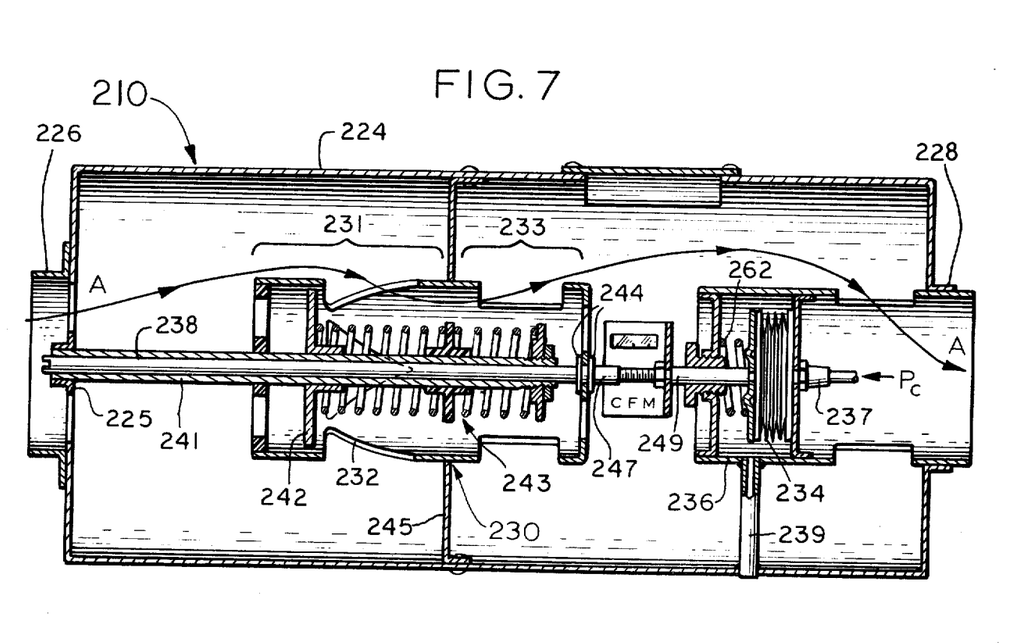
FIGS. 7 & 8 are also cross-sectional views which illustrate still further embodiments of the fluid flow regulator contemplated by the present invention.

Still another embodiment of the flow regulator of the present invention is detailed in FIG. 7. This embodiment may also be utilized effectively with a standard pneumatic thermostat in the air distribution system of FIG. 1.

The flow regulator 210 includes a housing 224 having an inlet end 226 and an outlet end 228. Disposed within the housing 224 is an axially displaceable duct 230 which has substantially open upstream and downstream ends and a lateral wall having an upstream portion 231 and a downstream portion 233. The upstream portion 231 includes at least one aperture 232 having a predetermined configuration. A shaft 238 extends axially through housing 224 and slidably engages the interior surface of an elongated bearing 241 which, in turn, is held in fixed axial position by press fit engagement with with spider 225 at the inlet end 226 of housing 224. The upstream end 231 of the duct 230 slidably engages the exterior surface of the bearing 241, and the downstream end 233 of the duct 230 is secured to shaft 238 by collars 244. A bellows enclosure 236 is disposed adjacent to the downstream end of the duct 230 and is provided with both a pressure signal receiving means 237 and a means 239 for venting the enclosure to atmospheric pressure. A bellows 234 is disposed within bellows enclosure 236 and is adapted to axially expand or compress in response to an air pressure signal $P_c$. The downstream end of shaft 238 extends into bellows enclosure 236 where its downstream end is secured to the free end of bellows 234. Accordingly, as the bellows 234 expands or compresses in response to changes in pressure signal $P_c$, the shaft 238 and duct 230 will axially displace in housing 224. A spring 262 is mounted on the downstream end of the shaft 238 within bellows enclosure 236. This spring yieldably resists expansion of the bellows 234 such that, for a given change in pressure signal $P_c$, a predetermined axial displacement of duct 230 will result, thereby providing the appropriate thermostatic adjustment required by the flow regulator of the instant invention.

The piston 242 and spring mechanism 243 are mounted on bearing 241 so that the piston axially displaces in response to pressure differentials on its upstream and downstream faces adjacent to the upstream portion 231 of duct 230 wherein the aperture 232 is located. A means is also provided for directing substantially all the air through the duct 230 as it passes through the flow regulator. For example, an annular bulkhead 245 may be fixedly attached to housing 224 at a point downstream from the aperture 232. The inner edge of this bulkhead should be in close proximity to, but spaced from, the exterior surface of the lateral wall of duct 230. While there is some leakage past the bulkhead 245, it is not of sufficient magnitude to materially affect the operation of the regulator.

Due to the fact that the forces exerted on shaft 238 by pressures $P_1$ and $P_2$ are negligible, it is unnecessary in this embodiment to provide any device or mechanism to counteract these forces. Nor is it necessary that the pressure signal $P_c$ be referenced to downstream pressure $P_2$. Accordingly, this regulator device may be used in conjunction with a standard pneumatic thermostat which references its output signal to atmospheric pressure.

The operation of this embodiment of the flow regulator of the present invention is substantially the same as those described hereinbefore. The displacement of piston 242 is solely a function of pressure differential $P_1-P_2$, and thermostatic adjustment is solely a function of pressure signal $P_c$. Thus, the essential relationship between aperture configuration and spring coefficient of stiffness is still utilized to provide an effective constant flow rate device, i.e., displacement of piston 242 relative to the aperture 232 is inversely proportional to the logarithm of the area of the air flow passageway.

It will be understood, however, from the foregoing description that this embodiment effects thermostatic adjustment by axial displacement of duct 230 and aperture 232 rather than by displacement of the flow restricting means. Moreover, the initial air flow setting is also effected by manual adjustment of the axial position of duct 230 rather than adjustment of the flow restricting means.

Accordingly, the shaft 238 includes an upstream and a downstream segment, 247 and 249 respectively. The downstream segment 249 is fixedly secured to the bellows 234 whereby rotation of this segment is inhibited. The upstream segment 247, on the other hand, is freely rotatable and threadably engages the downstream segment 249. Therefore, rotation of the upstream segment 247 will result in axial displacement of this segment along with duct 230 which is mounted thereon. In this manner an initial air flow setting may be made.

Still another embodiment of the present invention is contemplated which may be used effectively with a standard pneumatic thermostat within an air distribution system as illustrated in FIG. 1.

Figure 8:
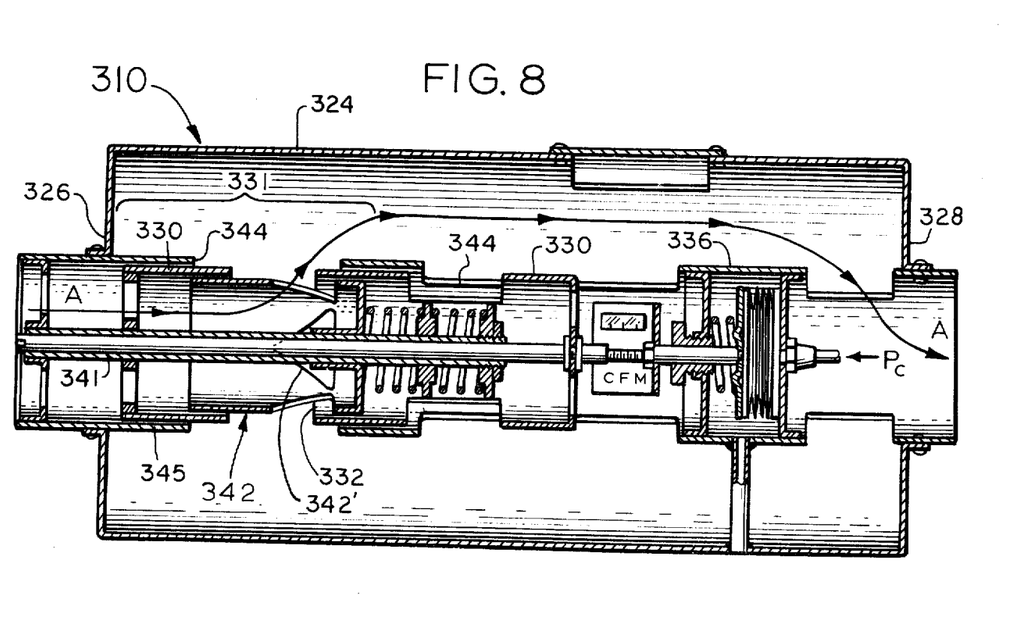

This embodiment, shown in FIG. 8, incorporates many of the features of the flow regulator 210 described in the preceding embodiment. It differs, however, in that the flow restricting means includes a cup-shaped piston 342 having a base and sidewalls which extend upstream from said base. Furthermore, the piston sidewall includes at least one aperture 342' having a predetermined configuration, and the duct 330 has disposed in its upstream portion 331 at least one rectangular opening 332. The aperture 342' and opening 332 are aligned so as to form a variable area flow passageway through which substantially all the air must flow in passing through the regulator.

This embodiment also differs from the preceding embodiment in that the means employed for directing substantially all the air through the duct 330 is a telescoping sleeve 345 which extends from the inlet end 326 of housing 324 in a downstream direction for a distance at least sufficient to slidably engage the upstream portion 331 of duct 330. It is important, however, that the sleeve 345 not restrict the air flow through the flow passageway formed by the piston aperture 342' and the rectangular opening 332. Therefore, should the sleeve 345 extend beyond the extreme upstream position of rectangular opening 332, it is necessary that the sleeve include openings 344 which coincide in position with openings 332 in duct 330 and which have a minimum size at least equal to that of the area covered by openings 332 as duct 330 is axially displaced. It is preferable that the sleeve 345 extend from the inlet end 326 of housing 324 to the bellows enclosure 336, as is shown in FIG. 8, since this arrangement provides greater ease of assembly and alignment. Therefore, openings 344 must be provided both coincident with openings 332 and downstream therefrom in order to allow the pressure differential $P_1-P_2$ to develop on upstream and downstream faces of cup piston 342.

It is, of course, important to the proper operation of the flow regulator 310 that the openings 344 in sleeve 345, the rectangular opening 332 in duct 330, and the configured aperture 342' in cup piston 342 all align so as to provide the appropriate air flow passageway. Accordingly, duct 330 and piston 342 may be keyed to bearing 341. Alternatively, bearing 341 may be formed having a polygonal exterior cross-section, thereby insuring proper alignment of piston 342 and duct 330, both of which slidably engage therewith.

Again, this embodiment makes use of the essential relationship between piston displacement and flow passageway area so as to provide a regulator capable of maintaining a constant flow rate over varying system pressures. It should be noted, therefore, that since the configured aperture is located in the wall of cup piston 342, it is necessary that it be disposed in reverse position, i.e., the aperture increases in lateral dimension in the downstream direction. Thus, maximum flow passageway area occurs when duct opening 332 and piston aperture 342' are in complete alignment, and as piston 342 displaces in the downstream direction this alignment decreases such that piston displacement is inversely proportional to the logarithm of flow passageway area.

IMPROVED PNEUMATIC THERMOSTAT

According to a final embodiment of this invention an improved pneumatic thermostat is provided which may be utilized effectively in the air distribution system illustrated in FIG. 1.

The improved thermostat as shown in FIG. 9 not only generates a pressure signal $P_c$ which is referenced to $P_2$, but also operates solely on energy derived from the air flow A being regulated.

Thus, as is shown in FIG. 1, the source of pressurized air which the pneumatic thermostat utilizes in order to generate $P_c$ is supplied via conduit from the upstream duct network. The thermostat also communicates with the duct network downstream from the regulator via the conduit shown in broken line. This is necessary in order to reference its output signal $P_c$ to pressure $P_2$.

The improved pneumatic thermostat contemplated by the present invention, designated generally 410, includes a pressure reducing element 412, a flapper and nozzle element 414, and a thermometric element 416. As is illustrated in FIG. 9, the pressure reducing element is at the top of the pneumatic thermostat. Air at a pressure of $P_1$, which may vary in magnitude through a range of 5:1 or more, enters via the air input port 418. The air at pressure $P_1$ flows through air restriction 420 into lower chamber 422 which is separated from upper chamber 424 by flexible diaphragm 425. A disc-shaped weight 426 is mounted on top of diaphragm 425, and is of such weight that its downward force equals the diaphragm area multiplied by the desired reduced pressure $P_s$ which flows into the flapper and nozzle element 414 via air restriction 434. Weight 426 has an aperture in its central portion and is mounted by a perforate eyelet to diaphragm 425 such that the lower chamber 422 may be vented to the upper chamber 424 which is at pressure $P_2$. Air at $P_1$ will flow into lower chamber 422 beneath the diaphragm 425 until the pressure within chamber 422 is slightly above $P_s + P_2$. At this point the diaphragm will lift off the nozzle 427 and bleed the space below the diaphragm until a pressure is reached within chamber 422 which is slightly below $P_s + P_2$. The diaphragm will then close nozzle 427. Thus, the pressure reducing element 412 of pneumatic thermostat 410 generates a constant reduced pressure $P_s$, relative to $P_2$, for a given wide variation in input pressure $P_1$.

Accordingly, a constant pressure $P_s$ is applied to the nozzle and flapper element 414 through restriction 434. The nozzle and flapper pneumatic element 414 includes a housing 436, a nozzle 438, a flapper 440, and an operating rod 450 centrally disposed within the housing and terminating in a ball 452. Flapper 440 is mounted on ball 452 by means of a snap fit socket and is capable of swiveling on ball 452 so as to provide proper alignment with nozzle 438. As the operating rod 450 moves in an upward, axial direction flapper 440 closes nozzle 438 such that the surrounding pressure and therefore pressure signal $P_c$ will increase. As the flapper 440 moves away from nozzle 438 there will be a greater exhaust flow to upper chamber 424, and the pressure within the housing 436 and pressure signal $P_c$ will diminish.

Therefore, due to the fact that the chamber within housing 436 exhausts via nozzle 438 to an upper chamber at a pressure $P_2$, the output pressure $P_r$ represents a pressure signal which is referenced to $P_2$ and which is a function of the flapper nozzle distance only, independent of variations in pressure $P_1$.

The pneumatic thermostat 410 also includes a thermometric element 416 which consists of at least one bi-metallic bellows 444. The preferred embodiment of the present invention includes two bi-metallic bellows axially aligned. One bellows sealably engages housing 436 and the other sealably engages bushing 448 which, is also sealably engage with operating rod 450. As the ambient temperature within the enclosed area serviced by the air distribution system changes, bellows 444 will expand or contract thereby changing the distance between nozzle 438 and flapper 440. Thus, it can be seen that the pressure signal $P_c$ generated by thermostat 410 is referenced to pressure $P_2$ but is a function of the ambient temperature only, and independent of variations in pressure $P_1$. Furthermore, threaded operating rod 450 engages bushing 448 such that the bellows 444 may be adjusted to provide an initial set point. Graduated dial 454 is disposed on bushing 448 in order to provide an appropriate reference in making the initial thermostatic setting.

As can be seen in FIG. 9, bellows 444 are positioned remote from pressure supply nozzle 434 such that the air flow into bellows 444 is minimal. Therefore, changes in the temperature of the air supplied to the nozzle and flapper element 414 will have a negligible effect on the expansion or contraction of bi-metallic bellows 444 and the resulting position of flapper 440. Of course, a varying degree of pneumatic feedback may be built into the thermometric element 416 by constructing the bi-metallic bellows 444 of a material which is sensitive, to a certain degree, to pressure changes within the housing 436. Thus, where the ambient temperature causes the bellows to compress thereby decreasing the distance between flapper 440 and nozzle 438 the pressure within housing 436 will increase. If the bi-metallic bellows are made of material which is sensitive to pressure changes then this increased pressure will cause the bellows to expand, providing a built-in feedback to the device.

In accordance with this embodiment of the present invention, as it is to be used with the flow regulator 10 shown in FIG. 2, thermostat 410 may be mounted in the ceiling of the enclosed area, serviced by the air distribution system, such that the thermometric element 416 is within the enclosed area. When the ambient temperature within the enclosed area changes, a corresponding change in the pressure signal $P_c$ will be transmitted from the thermostat 410 via output port 442 and conduit 39 to bellows enclosure 36. In turn, bellows 34 will expand or compress in response to the change in pressure signal $P_c$ so as to axially displace shaft 38. Likewise, the flow restricting means 40 which is mounted on shaft 38 will also be displaced resulting in a corresponding increase or decrease in the air flow passageway through aperture 32.

In this manner, the present invention provides an air distribution apparatus which is capable of maintaining a constant volume air flow and which is also responsive to changes in temperature within the enclosed area being serviced by the system. Moreover, since air from the inlet of the regulating device is used as a supply from which the temperature responsive signal is generated, the apparatus of the present invention is capable of operating independent from any external energy source other than that derived from the air flow being regulated.

While the flow regulator and pneumatic thermostat of the present invention have been described with respect to specific embodiments, it is of course possible to modify these embodiments without departing from the spirit and scope of the invention. For example, the housing, duct, air restricting means, and other associated flow regulator components may have cylindrical, rectangular, or other cross-sectional configurations. The regulating device and thermostat can be manufactured from any materials known to the art which provide the strength, durability and structural integrity required of the various components. Moreover, the invention is not limited to use within an air distribution system, but may be employed in other fluid handling systems where constant flow rates and temperature sensitive flow regulation may be desired.

I claim:
1. A device for regulating the airflow rate in an air distribution system comprising:
   a housing having two ends, one end defining an air inlet passageway and a second end sealably engaging a discharge duct, said duct having a lateral wall with at least one aperture therein;
   flow restricting means mounted within said duct adjacent said aperture and axially displaceable therein in response to pressure differentials between the portions of the air in said distribution system upstream and downstream from said regulating device, said flow restricting means including an axially extending shaft and a piston slideably mounted on said shaft and axially displaceable coincident with said aperture in response to said pressure differentials;
   spring means mounted on said shaft downstream from said piston and having a predetermined non-linear coefficient of stiffness for yieldably resisting the downstream displacement of said flow restricting means;
   said aperture and said flow restricting means together comprising means for forming a variable area airflow passageway through which substantially all the air must flow in passing through said regulating device; and
   said aperture having a size and shape including axial continuity and a continuously decreasing transverse dimension along the entire length of travel of said flow restricting means, and said spring coefficient of stiffness having a non-linear value such that the displacement of said flow restricting means is inversely proportional to the logarithm of the area of said fluid flow passageway continually along the entire length of travel of said flow restricting means.

2. The airflow regulating device of claim 1 wherein said aperture comprises a plurality of openings circumferentially spaced on said discharge duct, all said openings having a common axial position on said lateral wall to insure the axial continuity of said aperture.

3. The flow regulating device of claim 1 wherein said piston has a surface area smaller than the cross-sectional area of said discharge duct to form an annular airflow passageway having sufficient area to provide a predetermined minimum airflow when said piston is displaced to its extreme downstream position.

* * * * *

UNITED STATES PATENT AND TRADEMARK OFFICE
CERTIFICATE OF CORRECTION

PATENT NO. : 3,955,595
DATED : May 11, 1976
INVENTOR(S) : Edward E. Modes

It is certified that error appears in the above–identified patent and that said Letters Patent are hereby corrected as shown below:

Column 5, line 4 - "x and x'" should read "x and x'".

Column 5, line 52 - "exreme" should read "extreme".

Column 6, line 40 - "reduce thhe" should read "reduce the".

Column 7, line 14 - "$P_1$ and $P_2$" should read "$P_1 - P_2$".

Signed and Sealed this

Twenty-third Day of November 1976

[SEAL]

Attest:

RUTH C. MASON
*Attesting Officer*

C. MARSHALL DANN
*Commissioner of Patents and Trademarks*